US012792862B2

(12) United States Patent
Morales

(10) Patent No.: US 12,792,862 B2
(45) Date of Patent: Nov. 10, 2026

(54) PRINTING METHODS FOR ENHANCED PAPER SELECTION

(71) Applicant: Kyocera Document Solutions Inc., Osaka (JP)

(72) Inventor: Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 96 days.

(21) Appl. No.: 18/508,624

(22) Filed: Nov. 14, 2023

(65) Prior Publication Data

US 2025/0156665 A1 May 15, 2025

(51) Int. Cl.

| | |
|---|---|
| ***G06K 15/02*** | (2006.01) |
| ***G06F 3/12*** | (2006.01) |
| ***G06K 15/00*** | (2006.01) |

(52) U.S. Cl.

CPC ....... *G06K 15/4065* (2013.01); *G06K 15/408* (2013.01)

(58) Field of Classification Search

None

See application file for complete search history.

(56) References Cited

U.S. PATENT DOCUMENTS 10,423,367 B1 * 9/2019 Yamamoto ............ G06F 3/1207
10,931,842 B1 * 2/2021 Morales ............. H04N 1/00623
11,089,174 B1 * 8/2021 Morales ............. H04N 1/00633
11,544,025 B1 * 1/2023 Chang .................... G06F 3/1208
2004/0265026 A1 * 12/2004 Lermant ............ G03G 15/5087 400/76
2005/0063750 A1 * 3/2005 Lermant ............... G06F 3/1253 400/76
2007/0031162 A1 * 2/2007 Dombrowski ..... G03G 15/6508 399/81
2012/0237245 A1 * 9/2012 Mitsui ................ G03G 15/2021 399/69
2019/0107977 A1 * 4/2019 Yokoohji .............. G06F 3/1288
2023/0071492 A1 * 3/2023 Chang ................ G06K 15/1868
2023/0146892 A1 * 5/2023 Morales ................ G06F 3/1204 358/1.15
2024/0045625 A1 * 2/2024 Morales ................ G06F 3/1255

FOREIGN PATENT DOCUMENTS

JP 2015038697 * 2/2015 .............. B41J 29/38
JP 2016215453 * 12/2015 .............. B41J 29/38
JP 2017228242 * 12/2017 .............. B41J 29/38

* cited by examiner

*Primary Examiner* — Beniyam Menberu

(74) *Attorney, Agent, or Firm* — Millen, White, Zelano & Branigan P.C.; William F. Nixon

(57) ABSTRACT

A printing system includes a printing device having a paper catalog and paper trays of papers. A print job is received for the printing device. At least one attribute is determined for the print job. The attribute is determined to be a paper tray attribute or related to the paper catalog. If a paper tray attribute, then the print job is assigned to a paper tray. If related to the paper catalog, then a recommended list of papers is created. The recommended list is then used to determine a paper tray for the print job without the need for operator intervention.

16 Claims, 8 Drawing Sheets

PRINTING METHODS FOR ENHANCED PAPER SELECTION

FIELD OF THE INVENTION

The present invention relates to a printing device or system for selecting paper for printing operations using methods for enhanced paper selection.

DESCRIPTION OF THE RELATED ART

Aside from the number of copies, paper selection is an important print setting for jobs in a production print environment. Production printing devices manage papers using a paper catalog in the digital front end (DFE) of the printing device. The paper catalog may have hundreds of papers stored within. Operators must select the required paper from a long list of papers in the paper catalog. This process may be inefficient as it is left up to the operator to sort through a large list of papers that, in most cases, is composed largely of papers that are not appropriate for the current job. The process also may be impacted when the job calls for non-standard paper.

SUMMARY OF THE INVENTION

A method for managing printing operations at a printing device is disclosed. The method includes receiving a print job for the printing device. The print job specifies an attribute having a value. The method also includes determining whether the attribute is related to a paper tray configured on the printing device. The method also includes assigning the print job to be printed using the paper tray. The method also includes determining whether a first paper catalog entry is assigned to the paper tray. The method also includes assigning the first paper catalog entry to the print job. The method also includes printing the print job at the printing device using the paper tray using resources corresponding to the first paper entry.

The method further includes determining a second paper catalog entry is assigned to the paper tray. The method further includes determining a number of sheets for a first paper media corresponding to the first paper catalog entry and a number of sheets for a second paper media corresponding to the second paper catalog entry. The method further includes assigning the first paper catalog entry if the number of sheets for the first paper media is greater than the number of sheets for the second paper media. The method further includes assigning the second paper catalog entry if the number of sheets for the second paper media is greater than the number of sheets for the first paper media.

A method for managing printing operations at a printing device is disclosed. The method includes receiving a print job for the printing device. The print job specifies a first attribute. The method also includes determining whether the first attribute is related to a first paper catalog entry applicable for the printing device. The method also includes determining whether the first paper catalog entry corresponding to the print job is assigned to a paper tray configured at the printing device. The method also includes assigning the paper tray to the print job. The method also includes printing the print job at the printing device using the paper tray using resources corresponding to the first paper catalog entry.

A method for managing printing operations at a printing device is disclosed. The method includes determining that the printing device does not include a paper tray to match an attribute of a print job received at the printing device. The method also includes pausing the print job at the printing device. The method also includes generating an error regarding that the printing device does not include the paper tray. The method also includes creating a list of papers. Each paper in the list corresponds to a paper catalog entry related to the attribute and to a loaded paper tray at the printing device. The method also includes selecting a first paper from the list of papers to use for the print job. The method also includes assigning a first paper catalog entry corresponding to the first paper and a first loaded paper tray corresponding to the first paper catalog entry to print the print job.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps may be rearranged, combined, distributed, eliminated, or otherwise changed, while remaining with the scope of the disclosed embodiments.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1A:
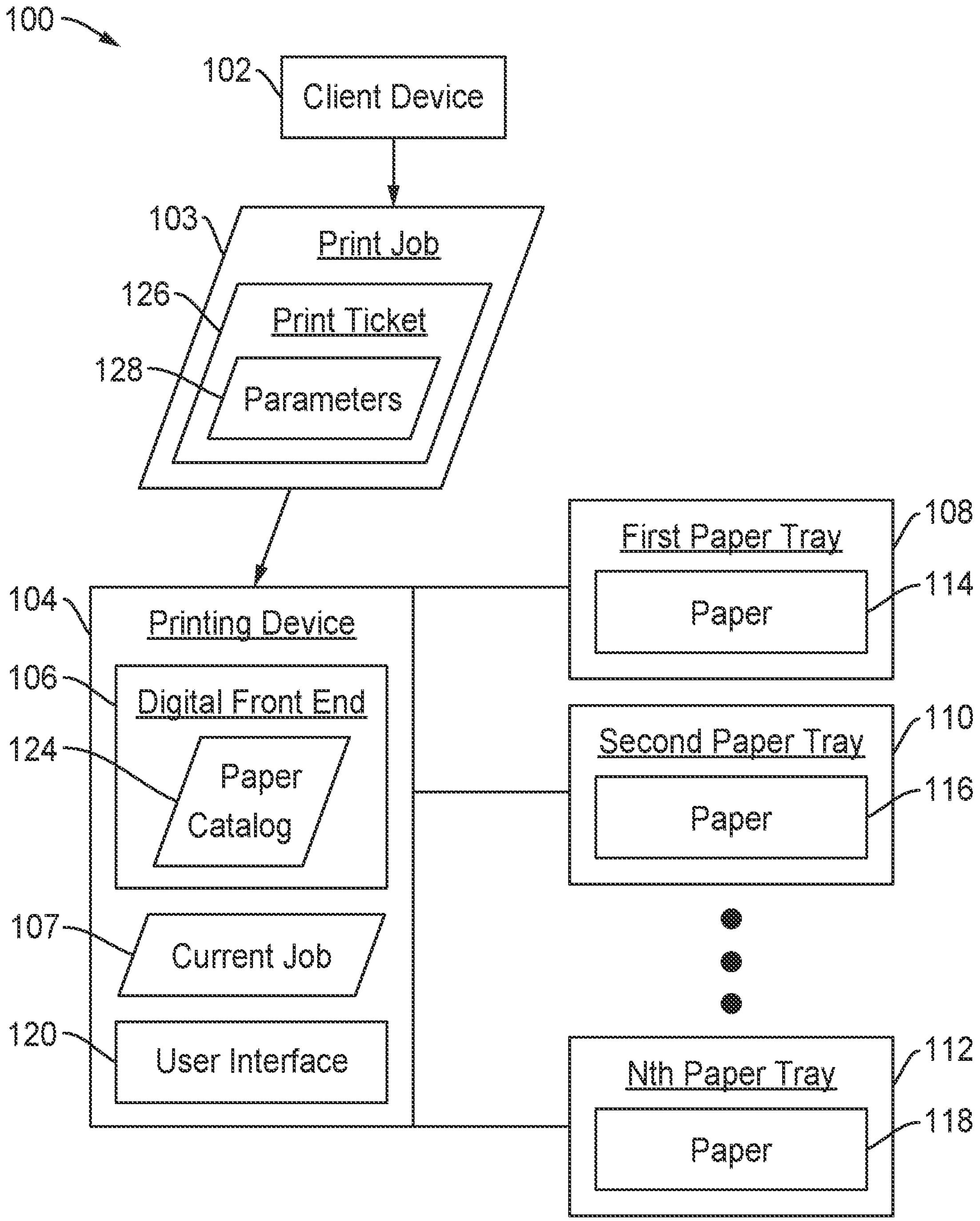
FIG. 1A illustrates a printing system having a printing device for printing documents according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

Paper selection for production printing devices may be based on a handful of attributes or on a paper catalog identifier. The attribute approach may be common in roll-fed printing devices. The paper catalog identifier approach may be common in sheet-fed printing devices. While both approaches work, an approach that blends both of these options may enable greater flexibility, especially when integrating with upstream systems. The disclosed embodiments leverage the recommended paper functionality through enhanced paper selection to enable automated and flexible selection paper catalog entries.

When a job that specifies paper attributes are received, the disclosed embodiments may inspect the attributes to determine whether the job should match to a paper tray or to a paper catalog entry. This determination is made by looking at both the media attributes that are used and the values for the media attributes. Specifically, the disclosed embodiments determine if there are any attributes that are only supported for the paper catalog. For example, some embodiments support specifying the following paper tray attributes dimensions, type, color, coating, and whether the paper is drilled or preprinted. As such, a job that specifies paper thickness, texture, or grain requires use of the paper catalog because these attributes only are supported by the paper catalog.

This list is not presented to the operator. Instead, the disclosed embodiments may look at the paper trays in the printing device to determine whether any of the recommended paper catalog entries are assigned to a tray. If so, then the disclosed embodiments may assign that paper catalog entry to the print job and print the job using that paper catalog entry. If there are multiple recommended paper catalog entries available, then the disclosed embodiments also may look at the total number of sheets that are loaded in the printing device and give preference to the paper for which there are enough loaded sheets to complete the job. Otherwise, the disclosed embodiments may select from the trays with recommended papers based on tray priorities defined at the printing device. Once a recommended paper is selected, then the disclosed embodiments may not switch to other recommended papers.

After determining the media attributes, the disclosed embodiments determine whether the job may be printed using either tray attributes or paper catalog entries. The disclosed embodiments analyze the attribute values to determine how the job should be printed. For example, paper trays may support a larger of media types versus the paper catalog. Alternatively, paper trays may support specifying whether a paper is a tab stock or a drilled paper but may not support specifying a set count for a tab stock or a hole pattern for drilled paper. If the job requires use of the paper catalog based on the attribute values, then the disclosed embodiments may operate in the same manner as above. If the job requires use of tray attributes, then the disclosed embodiments will match to a tray based on those attributes.

After determining the media attributes, the disclosed embodiments also may determine that the job may be printed using either a paper catalog entry or tray attributes. The disclosed embodiments select a paper source based on either available sheets or priority. The disclosed embodiments may not change the narrower paper selection once the disclosed embodiments select wither a paper catalog entry or tray attributes. The disclosed embodiments optionally may include a policy about whether to give preference to the paper catalog or tray attributes in cases in which the one or the other cannot be deterministically ascertained.

After the determination is made, the disclosed embodiments may find that there are no trays that meet the job requirements. In this case, the disclosed embodiments may stop the job and present an error to the operator asking for the missing paper. Unlike typical error messages, this error message presents all available options to the operator. If the job requires the paper catalog, then the disclosed embodiments may present the recommended paper list to the operator. This feature will let the operator know that any of the listed papers are acceptable for printing operations. If the job requires tray attributes, then the disclosed embodiments may preset the list of attributes to the operator. If the job requires both, then the disclosed embodiments may present all of this information to the operator.

If the operator reconfigures a tray so that it meets the job requirements, then the disclosed embodiments may match to that tray and then use whatever acceptable paper or tray attributes are selected. If the operator opens a tray, then the disclosed embodiments may present a configuration user interface that presents all acceptable options to the operator so that the operator may more easily reconfigure the tray with one of the acceptable options. Thus, the disclosed embodiments allow flexible use of the paper catalog without requiring that the upstream system import or otherwise consume the paper catalog for the printing device.

FIG. 1A depicts a printing system 100 for printing documents according to the disclosed embodiments. Printing system 100 includes printing device 104. Printing device 104 is disclosed in greater detail below. Printing device 104 may receive one or more print jobs 103 within printing system 100. For example, client device 102 may generate and send print job 103 to printing device 104. In some embodiments, printing device 104 may be a production printing device in that print jobs are provided through client device 102, which is attached to the printing device. Such a print job may require 1000s of pages or even 100,000 pages or more.

Print job 103 may include a print ticket 126 that sets forth one or more parameters 128 for the print job. For example, print tickets 126 may specify a size for a sheet of print job 103 as well as weight, quality of paper, color of paper, punched holes, and the like. The operator may generate print ticket 126 when submitting print job 103 for printing within printing system 100. Information from print ticket 126, such as one or more parameters 128, may be used to generate a list of recommended papers to display for print job 103.

Printing device 104 may receive print job 103 as it is processing and printing current job 107. Current job 107 may use different paper or media than print job 103. As such, printing device 104 may include a plurality of paper trays to supply papers of various types, sizes, weights, and the like. Thus, printing device 104 includes first paper tray 108 having paper 114, second paper tray 110 having paper 116, and so on to Nth paper tray 112 having paper 118. Current job 107 may use paper from one or more of these paper trays. In some embodiments, paper 114, paper 116, and paper 118 are different types of paper or different media. For example, current job 107 may use paper 116 from second paper tray 110 while print job 103 may require paper 114 from first paper tray 108.

User interface 120 may be in operation panel 208, disclosed below, or part of digital front end (DFE) 106. DFE 106 is disclosed in greater detail below. DFE 106 may process print jobs and act as a controller for printing device 104. Alternatively, user interface 120 may be displayed on client device 102. The disclosed embodiments may use user interface 120 to select papers for print job 103.

DFE 106 also includes paper catalog 124. Paper catalog 124 is configured to organize and store existing calibration data and ICC profiles for a paper. Upon selection of a paper for printing at printing device, paper catalog 124 may be accessed to complete print job 103 according to the expectations associated with the print job. Paper catalog 124 is disclosed in greater detail below by FIG. 3. In some embodiments, DFE 106 may include multiple paper catalogs. Further, paper catalog 124 also may be stored in another component within printing system 100 and accessible by DFE 106.

Figure 1B:
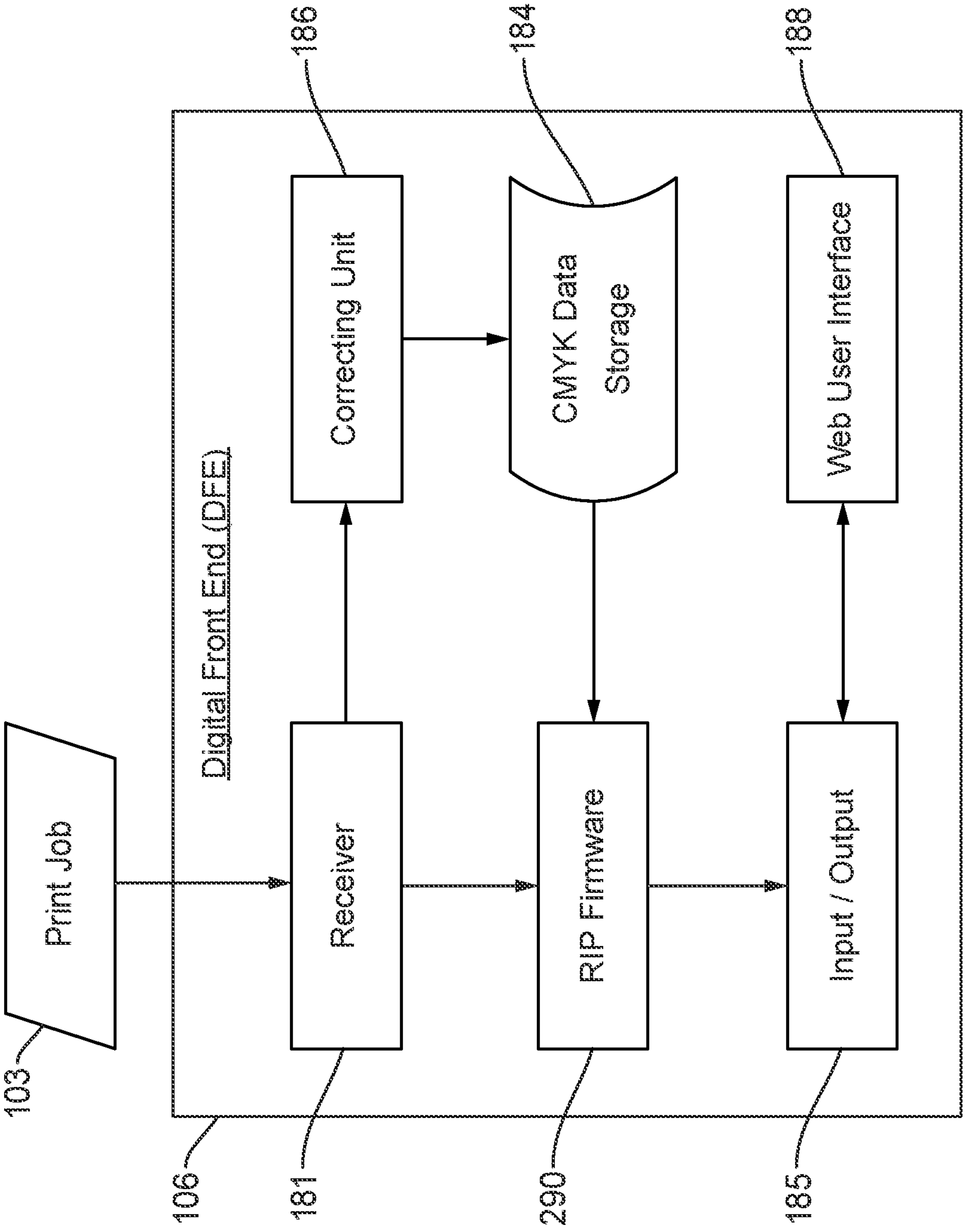
FIG. 1B illustrates a digital front end (DFE) for a printing device according to the disclosed embodiments.

FIG. 1B depicts a block diagram of DFE 106 according to the disclosed embodiments. DFE 106 includes a receiver 181, a RIP firmware 290, a CMYK data storage 184, an input/output connector 185, and a correcting unit 186. Additional components within DFE 106 may be implemented, as disclosed below.

Receiver 181 receives print job 103 received within system 100 and outputs the print job to RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

RIP firmware 290 converts image data associated with the print job into raster data to thereby generate rendering data, and outputs the generated rendering data. RIP firmware 290 also converts the rendering data into rendering data in a CMYK format. When the rendering data is originally in the CMYK format, or CMYK rendering data, the conversion may not be performed. RIP firmware 290 may perform gradation conversion of the CMYK rendering data, with reference to one or more tone reproduction curves (TRCs). A TRC refers to data indicating the relationship between a colored gradation value for rendering data and print color, or print density, on a given print medium.

When print color provided alters over time, the TRCs stored in CMYK data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in CMYK data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in CMYK data storage 184 is replaced with the generated TRC. Correcting unit 186 may correct the TRC. Correcting unit 186 may rewrite a part of the TRC stored in CMYK data storage 184 to thereby correct the TRC.

The rendering data generated by RIP firmware 290 may be transmitted within printing system 100 via input/output connector 185. The print condition information and the print medium type, as well as the rendering data, may be transmitted to a selected printing device within printing system 100. As disclosed above, the rendered data may be in a file format acceptable for a printing device such that the print job is provided directly to the print engine of the printing device.

DFE 106 also includes web user interface 188 that may communicate with other devices within printing system 100, if it is located at a separate device, using, for example, input/output connector 185. Web user interface 188, or web application, allows a user of the DFEs of other printing devices to interact with content or software running on DFE 106.

Figure 2:
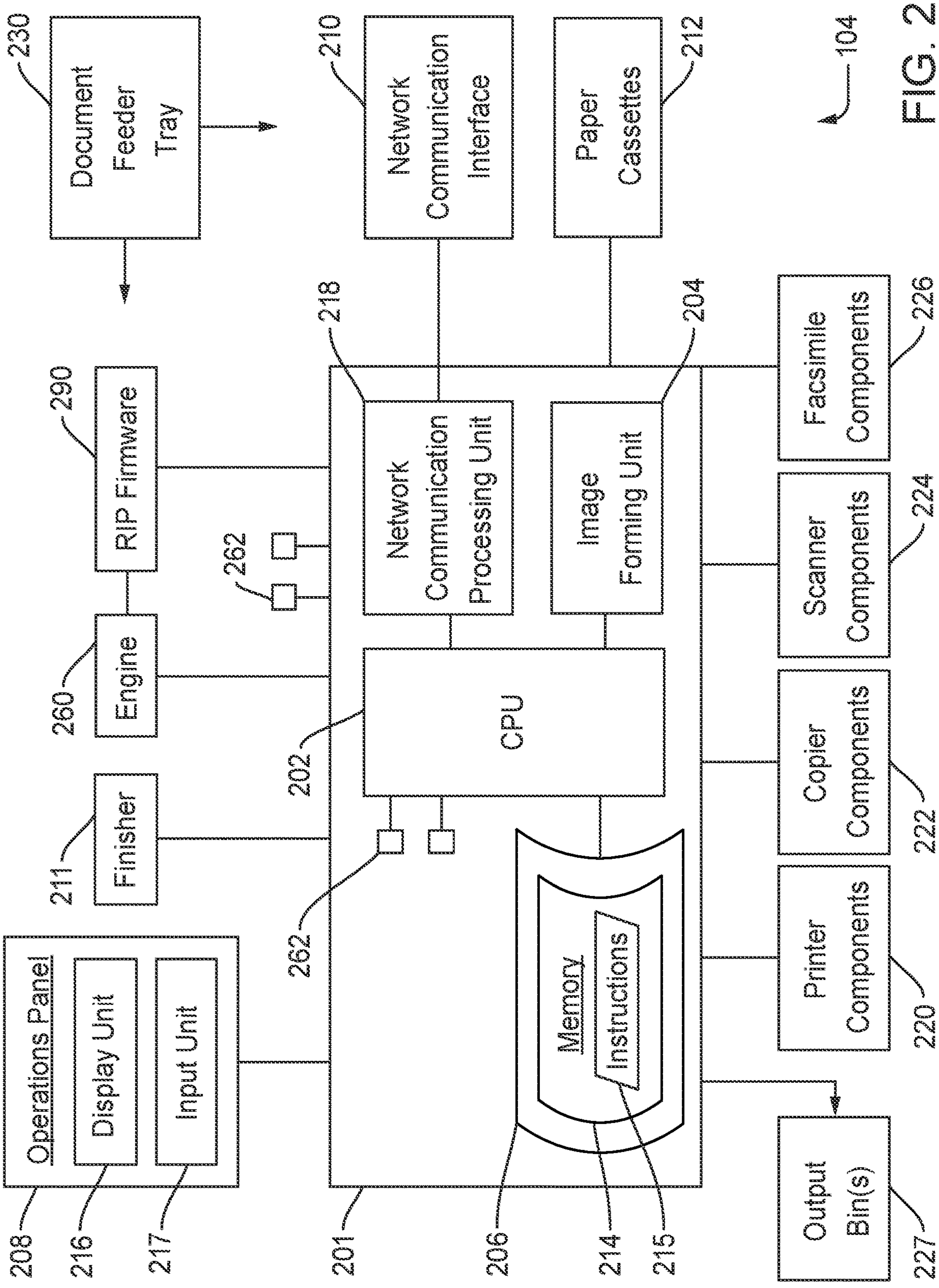
FIG. 2 illustrates a block diagram of components of the printing device for use within the printing system according to the disclosed embodiments.

FIG. 2 depicts a block diagram of components of printing device 104 according to the disclosed embodiments. The architecture shown in FIG. 2 may apply to any multi-functional printing device or image forming apparatus that performs various functions, such as printing, scanning, storing, copying, and the like within system 100. As disclosed above, printing device 104 may send and receive data from DFE 106 and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 also may be known as paper trays, shown as paper trays 108, 110, and 112 in FIG. 1A. Paper cassettes 212 may include papers having various sizes, colors, composition, and the like. Papers or media within paper cassettes 212 may be considered "loaded" onto printing device 104. The information for printing these papers may be captured in a paper catalog stored at DFE 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device 104 to receive papers and documents to be processed. Feeder tray also may refer to one or more input trays for printing device 104. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with print engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Display unit 216 also may serve as to display results from DFE 106, if applicable. DFE 106 may send calibration and paper catalog information to printing device 104 for display. For example, the operator at DFE 106 may send a calibration to printing device 104. Printing device 104 displays paper type and any other information needed to complete the calibration.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes print engine 260, as disclosed above. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of ink or toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device. Memory unit 206 may store the history of failure events and occurred errors with a timestamp of each error.

Printing device 104 communicates with other devices within system 100 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from DFE 106 as well as other devices within system 100.

Figure 3:
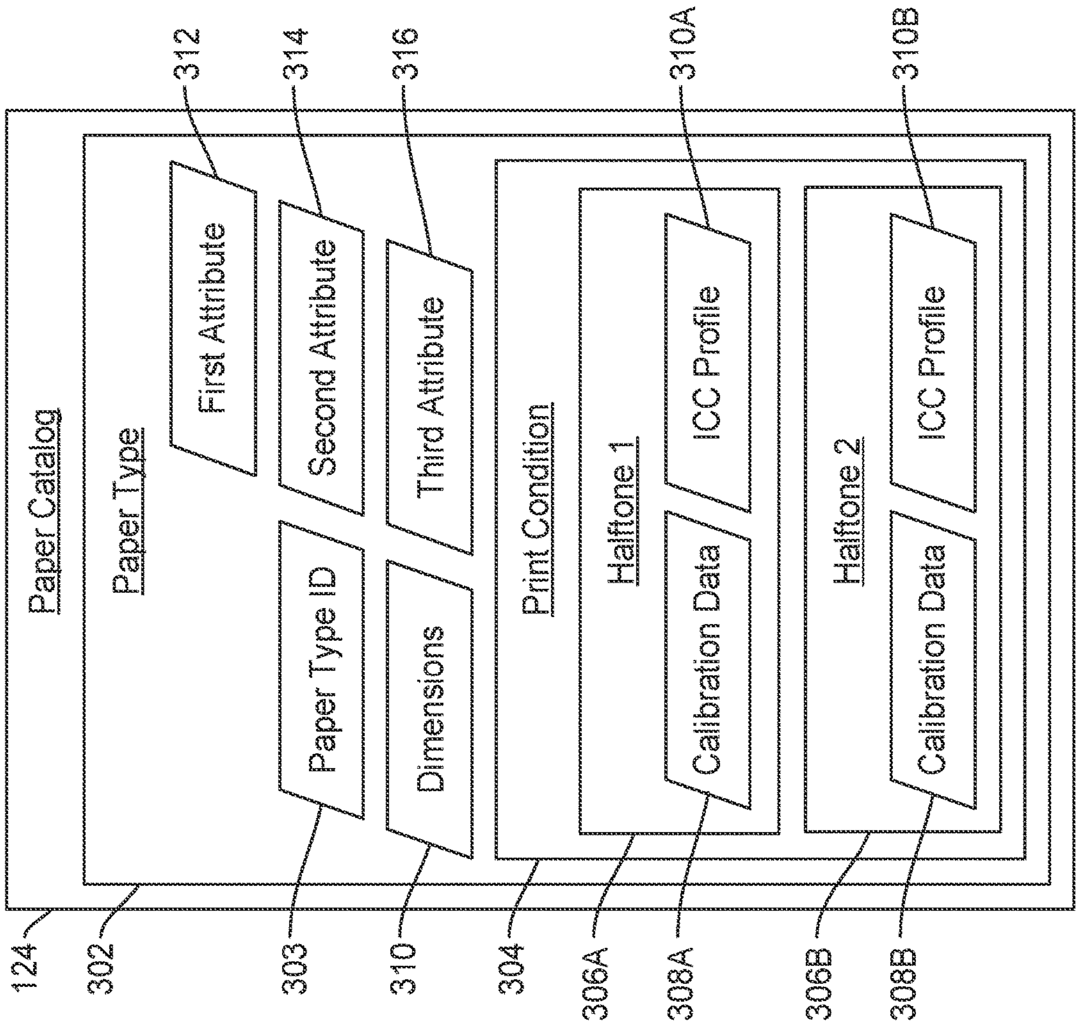
FIG. 3 illustrates a block diagram of a paper catalog for use within the printing system according to the disclosed embodiments.

FIG. 3 depicts a block diagram of paper catalog 124 for use within printing system 100 according to the disclosed embodiments. As disclosed above, paper catalog 124 may reside within DFE 106 of printing device 104. In other embodiments, paper catalog 124 may reside in another component within printing system 100, such as client device 102 or an external server. For brevity, paper catalog 124 is disclosed below as residing within DFE 106.

For each paper type used for a particular model of printing device 104, there are a set of items that work together to achieve optimal reproduction capabilities. These items may be represented in paper catalog 124. An example of an entry in paper catalog for a paper type 302 may be shown. Paper catalog may include hundreds or thousands of such entries. Paper type 302 may be identified within paper catalog 124 by paper type identification 303. In some embodiments, paper type identification 303 may be a unique symbol or code that identifies paper type 302 within paper groups, disclosed in greater detail below.

Paper type 302 includes print conditions. Print conditions may be applied to print jobs using paper type 302. Examples of print conditions may be high quality, default, ink saving, and the like. Each print condition may include its own color printing resources, such as calibration data and ICC profiles. Application of a print condition results in a different result for a print job using paper type 302 at printing device 104. For example, a high quality print condition will differ in some fashion as a finished, printed document from one printed using the default print condition.

As shown in FIG. 3, paper type 302 may include print condition 304. It also may include additional print conditions. Print condition 304 may relate to the high quality print condition for printing paper type 302 at printing device 104. Within print condition, halftones, or halftone designs, may be defined. Printing device 104 may have one or more halftones. Halftones are binary on/off dot patterns of each ink to mimic continuously varying transitions. One halftone could emphasize details in the image, while another could be best for smooth transitions. Thus, print condition 304 includes halftone 306A and halftone 306B. For example, halftone 306A may correspond to the halftone design to emphasize details in the image being printed. Halftone 306B may correspond to the halftone design to provide for smooth transitions.

For each halftone, the print shop should capture the desired per-colorant behavior over all shades of that colorant. By behavior, the disclosed embodiments refer to the color measurement. The record of these colorant behaviors, and the information that allows printing device 104 to be adjusted back to such behaviors, are stored as calibration data. These adjustments may vary linearly or with a curve. The calibration data include characteristics of each ink under the halftone selected. Thus, halftone 306A includes calibration data 308A and halftone 306B includes calibration data 308B.

Further, with a selected halftone, and the calibration data enforced to produce desired behavior of each colorant, the disclosed embodiments then create an ICC profile to fully characterize how ink combinations relate to standardized color measurements, as disclosed above. It is via the ICC profile that, for the specific paper-halftone-calibration-data set up, printing device 104 can reproduce the colors, text, and parameters of the original document. The process for generating an ICC profile is disclosed above. Thus, halftone 306A includes ICC profile 310A and halftone 306B includes ICC profile 310B.

Often printing systems have additional "dials" for more customized controls. For instance, there are settings of total ink amounts allowed in the ICC profile for preserving the glossy finish of a paper. Alternatively, it could be a very conservative expectation of the black ink response set into the calibration data. These more specific customizations may be identified as print conditions. In the scheme of the aforementioned items affecting color management, the disclosed embodiments place print conditions at the highest tier under each paper type, as shown in FIG. 3 by print condition 304.

Paper type 302 along with print condition 304 and halftones 306A and 306B may refer to the print management resources and items for one paper type. In a print shop, for each model of printing device 104, there may be dozens or more paper types in use. To keep track of the print management items for all these papers, paper catalog 124 may be implemented in system 100. As disclosed above, paper catalog 124 may be a software data storage system that archives all the color management items and resources for each paper type in use. When a print job is specified on a particular paper, identified as paper type identification 303, under a chosen print condition 302 employing halftone 306A, paper catalog 124 will provide the proper corresponding calibration data 308A and ICC profile 310A for printing device 104 to use. If the print job specifies print condition 302 employing halftone 306B, then paper catalog 124 will provide calibration data 308B and ICC profile 310B for printing device 104 to use for the print job.

The entry for paper type 302 also may include dimensions 310, such as length and width of a sheet of the paper type. Dimensions 310 may be a standard size of paper or a non-standard size. Paper type 302 also may include one or more attributes for the paper. For example, first attribute 312 may be the weight of a sheet of paper type 302. First attribute 312 may be 120 grams per square meter (gsm). Heavier paper is reflected by a higher number for gsm. Generally, heavier paper is associated with a higher quality of stock. It should be noted that dimensions 310 may also be considered an attribute of paper type 302. Further, first attribute 312 may be considered a dimension of paper type 302.

Paper type 302 also may include second attribute 314 and third attribute 316. These attributes may pertain some other feature of the paper of paper type 302 aside from dimensions and weight. Second attribute 314 may refer to the color of the paper for paper type 302, such as white, blue, yellow, and the like. Third attribute 316 may refer to a feature of the paper of paper type 302, such as recycled, new, and the like. Other potential attributes may be glossy or matte paper.

Dimensions and attributes within paper catalog 124 may not necessarily match the attributes for paper trays 108, 110, and 112. Paper trays 108, 110, and 112 also may have attributes that apply to print job 103 as specified by print ticket 126. Dimensions 310 may be included in print ticket 126. Dimensions 310 also may apply to a parameter within paper catalog 124 and paper trays 108, 110, and 112. The other attributes, however, within paper catalog 124 may not apply to any attribute for paper trays 108, 110, and 112.

Figure 4:
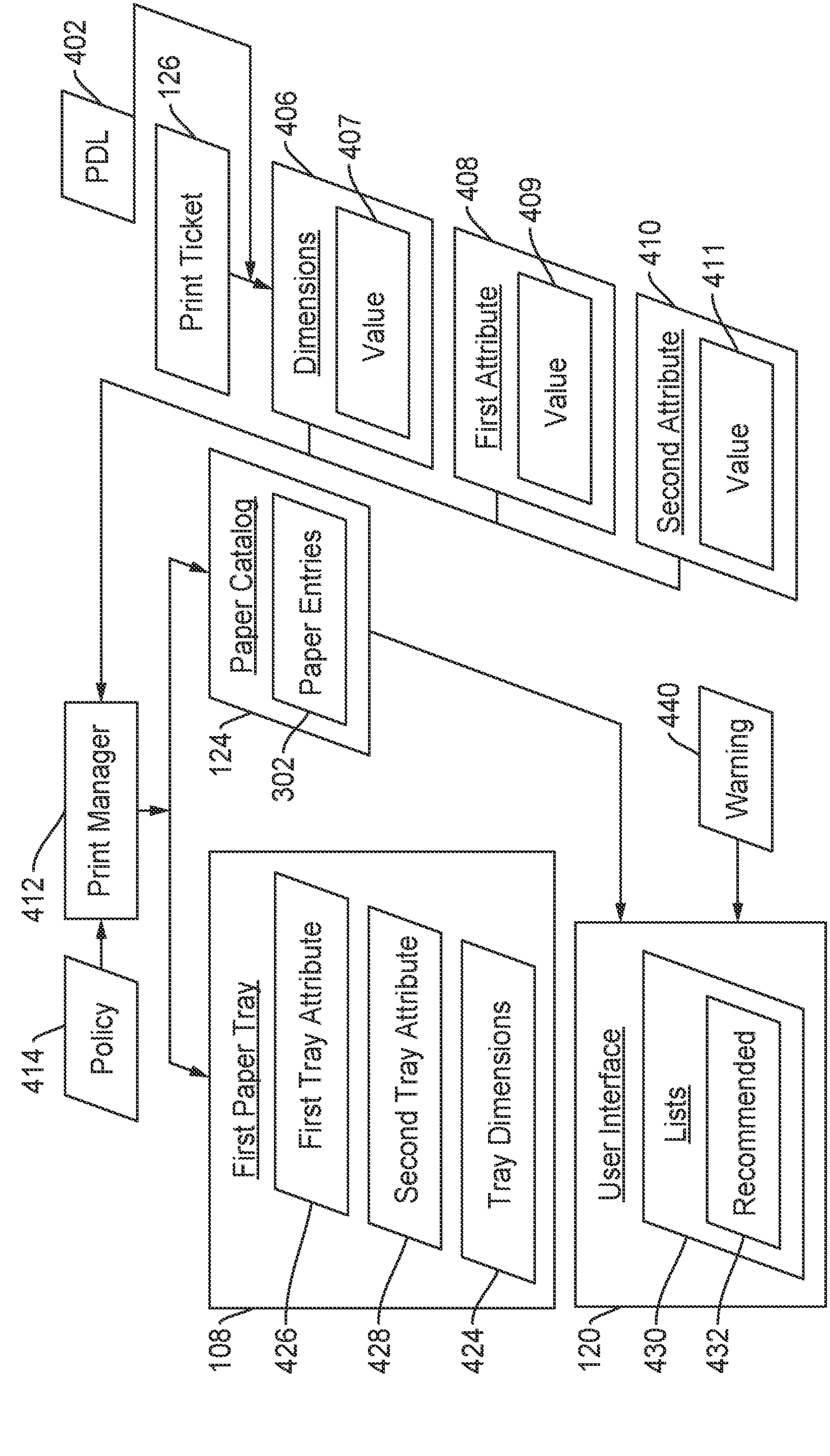
FIG. 4 illustrates a block diagram of attributes applicable to the paper catalog and a first paper tray according to the disclosed embodiments.

FIG. 4 depicts a block diagram of attributes applicable to paper catalog 124 and first paper tray 108 according to the disclosed embodiments. The elements disclosed by FIG. 4 may include components within DFE 106, such as paper catalog 124 and page description language (PDL) file 402 for print job 103. PDL file 402 may be processed within DFE 106 by RIP firmware 290 to interpret the data of the file and render the data to be printed by print engine 260. During processing of PDL file 402, various parameters may be determined or created for the file, such as dimensions and attributes for print job 103.

As noted above, lists 430 may be displayed within user interface 120. Lists 430 may include papers or groups of papers to present to the operator for printing operations. Lists 430 may be in the form of a menu that includes tabs for the operator to select or obtain further information for each list. For example, lists 430 may include a list for the entire paper catalog 124. The disclosed embodiments, however, enable a multi-tab menu that separates papers into multiple lists or more targeted lists.

One list of lists 430 may display recent papers used at printing device 104 or within printing system 100. Another list may include "favorites" noted by the operator or other operators. The recent and favorite papers may be combined into one list to be displayed at user interface. Further, a list may be provided for papers 114, 116, and 118 loaded into paper trays 108, 110, and 112, respectively, at printing device 104.

Another list may be recommended list 432. Recommended list 432 displays groups or subsets of groups that are recommended for print job 103. Recommended list 432 may be based on several factors, including dimensions 406, a first attribute 408, and a second attribute 410 of print job 103. The disclosed embodiments may use these parameters of print job 103 to refine the plurality of papers within paper catalog 124 to provide recommended list 432 that better shows the available options to the operator.

Parameters for print job 103 may be set forth in print ticket 126 as parameters 128 or determined when processing PDL file 402 within DFE 106. Dimensions 406 may refer to dimensions for one or more sheets of print job 103. If print ticket 126 for print job 103 does not include any instructions related to the desired paper type, then the disclosed embodiments will determine dimensions 406. Paper entries 404 of paper catalog 124 may be searched for papers having dimensions 310 that match dimensions 406. These paper entries may be provided in recommended list 432.

Further print or job attributes may be defined such that recommended list 432 includes recommended papers from paper catalog 124 that specifically address the requirements to print the job. Again, the papers within recommended list 432 may not be specifically specified by print ticket 126 or parameters 128 for print job 103, but compiled from paper catalog 124. The operator may not be aware of better options to complete print job 103. The disclosed embodiments also remove the need to search through paper catalog 124 manually or through long lists of papers that do not meet the needs of the print job.

In some instances, print job 103 may specify a paper tray. In these instances, the dimensions configured for the paper tray should match or be able to process dimensions 406 for print job 103. Thus, the disclosed embodiments may check the paper tray to make sure it can print a paper having dimensions 406 before presenting papers in recommended list 432. For example, if none of the paper trays are not configured to print a custom size paper, then papers having the custom size may not be displayed in recommended list 432.

Referring to FIG. 4, first paper tray 108 is shown. Second paper tray 110 and Nth paper tray 112 also may be configured on printing device 104, but not shown due to brevity. First paper tray 108 may include tray dimensions 424 that indicates which sizes of paper are capable of being stored within first paper tray 108. Tray dimensions 424 may vary depending on the current paper, or paper 114, in first paper tray 108. DFE 106, if compiling the groups for recommended list 432, may query first paper tray for tray dimensions 424 to eliminate any groups not suitable based on the tray dimensions.

First paper tray 108 also may include first tray attribute 426 and second tray attribute 428. Tray attributes may pertain to attributes not listed in paper catalog 124 for paper entries 302 but nonetheless impact which papers to use at printing device 104. For example, first tray attribute 426 may be the maximum number of sheets that can be stored within first paper tray 108. Second tray attribute 428 may be number of sheets currently within first paper tray 108.

If tray dimensions 424 do not match dimensions 406 for print job 103, then the disclosed embodiments may send a warning 440 to user interface 120 for the operator. Warning 440 may be provided in recommended list 432 along with the group of paper entries having the dimensions not currently supported by the paper tray. Preferably, the list of papers in recommended list 432 does not change based on the specified tray. Warning 440 is intended to let the operator know that first paper tray 108 cannot support dimensions 406. The operator may take action to configure first paper tray 108 to enable the use of dimensions 406.

The disclosed embodiments also determine print job 103 along with first attribute 408 and second attribute 410 should match to a paper tray or a paper catalog entry. This feature provides greater flexibility during printing operations. The operator should not have to stop printing operations to specify whether an attribute for print job 103 corresponds to a paper tray attribute, such as first tray attribute 426, or an entry within paper catalog 124. Some attributes may apply to one component but not the other. Paper tray attributes may correspond to the size, weight, or type of paper while paper catalog entries my correspond to a small number of media attributes, such as weight.

For example, a lot of attributes defined in a paper catalog entry 302, such as print conditions, are not defined for a paper tray loaded onto printing device 104. Further, not many attributes in paper catalog 124 have defined values. Conversely, a paper tray, such as first paper tray 108, may not have as many attributes as paper catalog 124, but will have broader values for its attributes. Using this example, a paper of a group of papers corresponding to paper entry 302 may have a first attribute 312 for weight. Each paper in the group of papers may have different weights, such as 100 gsm for an economy print condition, 120 gsm for a standard print condition, and 130 gsm for a premium print condition, as defined by first attribute 312. Second attribute 314 may define the paper as coated, which applies to all the paper in the group of papers.

If print job 103 specifies a value 409 for paper weight in first attribute 408 for print job 103, then the disclosed embodiments will determine that attribute pertains to a paper catalog entry 302 and match print job 103 to the paper catalog entry. Paper weight is not a concern of paper trays, and value 409 does not pertain to a paper tray attribute. Print job 103 also may have a value 411 for second attribute 410 of coated. First paper tray 108 may include a coated paper 114 having 100 gsm while second paper tray 110 may have a coated paper 116 having 120 gsm. The paper trays will not have attributes or information to identify the different papers from each other, while paper catalog 124 will. Thus, the disclosed embodiments will select paper catalog 124 to select the paper for print job 103.

Alternatively, first attribute 408 may include a value 409 for a number of copies for print job 103. The number of sheets of paper is a paper tray attribute in that first paper tray 108 may have a number of sheets loaded in the paper tray as first tray attribute 426. In this instance, the disclosed embodiments will match the paper to be used for print job 103 to first paper tray 108 as the number of sheets are available to print the job without interruption.

Thus, the disclosed embodiments may include a print manager 412 that determines whether to apply an entry within paper catalog 124 or a paper tray attribute in selecting which paper to use in printing operations. Print manager 412 may be implemented within DFE 106. Alternatively, print manager 412 may be implemented elsewhere in printing system 100, such as within a print management server. When a job specifies paper attributes, print manager 412 inspects the attributes to determine whether the job should match to a paper tray or a paper catalog entry.

Print manager 412 analyzes media attributes and the values for the media attributes. For example, print job 103 may include dimensions 406, first attribute 408, and second attribute 410. As disclosed above, these items may be specified by print ticket 126 or derived from PDL file 402. Determination is made by looking at first attribute 408 having value 409 and second attribute 410 having value 411. Dimensions 406 also may have value 407 for the dimensions of the paper. In some embodiments, dimensions 406 are not included. Print manager 412 may determine that first attribute 408 and second attribute 410 only are supported for paper catalog 124.

For example, some embodiments support specifying the following attributes for first paper tray 108, second paper tray 110, and Nth paper tray 112. For brevity, only first paper tray 108 may be disclosed below. These paper tray attributes, shown as tray dimensions, first tray attribute 426, second tray attribute 428, and other tray attributes not shown in FIG. 4 may include type, color, coating, and whether the paper is drilled or preprinted. Print job 103 may specify a first attribute 408 having a value 409 for paper thickness, a second attribute 410 having a value 411 for texture, or another attribute having a value for grain, which are not tray attributes. Thus, print manager 412 will use paper catalog 124 because these attributes only are supported by the paper catalog.

If print job requires the use of paper catalog 124, then print manager 412 can generate a recommended list 432 of papers using the entries in paper catalog 124 of papers that include first attribute 408, second attribute 410, and other attributes. Recommended list 432, in this embodiment, may not be provided to user interface 120. Instead, print manager 412 may look at first paper tray 108, second paper tray 110, to Nth paper tray 112 to determine whether any of the papers on recommended list 432 are assigned to one or more of the paper trays.

For example, one of the paper catalog entries 302 within recommended list 432 may be paper 114 loaded onto first paper tray 108. As a result, print manager 412 may assign paper catalog entry 302 for paper 114 to print job 103 and print the document using that paper catalog entry. If there are multiple recommended paper catalog entries 302 available, then print manager 412 also may determine the total number of sheets loaded within one or more paper trays at printing device 104. Preference may be given to the paper having enough loaded sheets to print the document for print job 103. For example, one paper catalog entry 302 may have a number of sheets of paper 114 loaded onto first paper tray 108. This number exceeds second attribute 410 having value 411 of the number of sheets for print job 103. Thus, that paper catalog entry 302 is assigned to print job 103.

Alternatively, print manager 412 may select from the paper trays with recommended papers 432 based on tray priorities defined at printing device 104. For example, print manager 412 may include a policy 414 to always use first paper tray in the event multiple recommended papers are included in recommended list 432. Thus, paper catalog entry 302 for paper 114 will be assigned to print job 103. Print job 103 may be printed using the resources defined within paper catalog entry 302, as disclosed in FIG. 3. Further, once a recommended paper is selected, print manager 412 may not switch to another recommended paper within recommended list 432.

In other embodiments, print manager 412 determines that print job 103 is printed using either paper tray attributes, such as first tray attribute 426 and second tray attribute 428, or paper catalog entries 302. First attribute 408 and second attribute 410 may pertain to first paper tray 108 or paper catalog entries 302. Print manager 412 then may look at attribute values, such as value 409 for first attribute 408 and value 411 for second attribute 410, to determine how print job 103 should be printed.

For example, first paper tray 108, second paper tray 110, up to Nth paper tray 112 may support a larger number of paper types as opposed to paper catalog 124. Alternatively, the paper trays usually support specifying whether a paper is tab stock or a drilled paper but they do not support specifying a set count for a tab stock or a hole pattern for a drilled paper. Thus, first attribute 408 may specify a drilled paper but value 409 may specify a hole pattern, which is applicable to a paper catalog entry instead of a paper tray. Print manager 412 then operates as disclosed above for attributes suitable for paper catalog 124. If print job 103 requires first tray attribute 426 or second tray attribute 428, then print manager 412 will match the print job to a paper within a paper tray, as disclosed above.

In other embodiments, print manager 412 determines that print job may be printed using either a paper catalog entry 302 or tray attributes of first paper tray 108, even after analyzing values of the attributes for print job 103. Print manager 412 may select a paper based on either available sheets or priority set forth for printing device 104. This feature is disclosed above. Once print manager 412 selects a paper catalog entry 302 or tray attributes for first paper tray 108, it will not change the narrower paper selection.

Print manager 412 also may implement a policy 414 within DFE 106 about whether to give preference to paper catalog 124 or tray attributes for first paper tray 108 in the event one or the other cannot be adequately ascertained. For example, first attribute 408 may relate to paper catalog entries 302 and second attribute 410 may relate to first tray attribute 426 of first paper tray 108. Values 409 and 411 are not determinative. Policy 414 may specify that, in these cases, paper catalog 124 is used to select a paper catalog entry 302 to assign a paper for print job 103. Policy 414 also may include special papers that override the preference for paper catalog 124 and, instead, use tray attributes to select the paper to print the job.

In some embodiments, print manager 412 may find that first paper tray 108, second paper tray 110, up to Nth paper tray 112 are not able to meet the requirements for print job 103, as set forth by first attribute 408 and second attribute 410, plus any other attributes. Print manager 412 may stop printing operations and present an error or warning 440 to the operator asking for the missing paper. Unlike typical warning messages, warning 440 may present all available options to the operator.

For example, if print job 103 requires use of paper catalog 124, then print manager 412 may present recommended list 432 to the operator using user interface 120. This feature will let the operator know that any of the listed papers in recommended list 432 are acceptable. If print job 103 requires tray attributes of first paper tray 108 (or any other paper tray), then print manager 412 may present of paper tray attributes to the operator. For example, user interface 120 may display first tray attribute 426 and second tray attribute 428. If print job 103 requires both paper catalog 124 and tray attributes, then print manager 412 may present all of this information (recommended list 432 and the tray attributes) to the operator, such as using user interface 120.

If the operator reconfigures first paper tray 108 so that it meets the requirements for print job 103, the print manager 412 may match to first paper tray 108 and then use whatever acceptable paper or tray attributes that were selected. For example, if the operator opens first paper tray 108, then print manager 412 may present a configuration user interface 120 that presents all acceptable options to the operator so that the operator can more easily reconfigure first paper tray 108 with one of the acceptable options according to recommended list 432 or the listed tray attributes.

Figure 5:
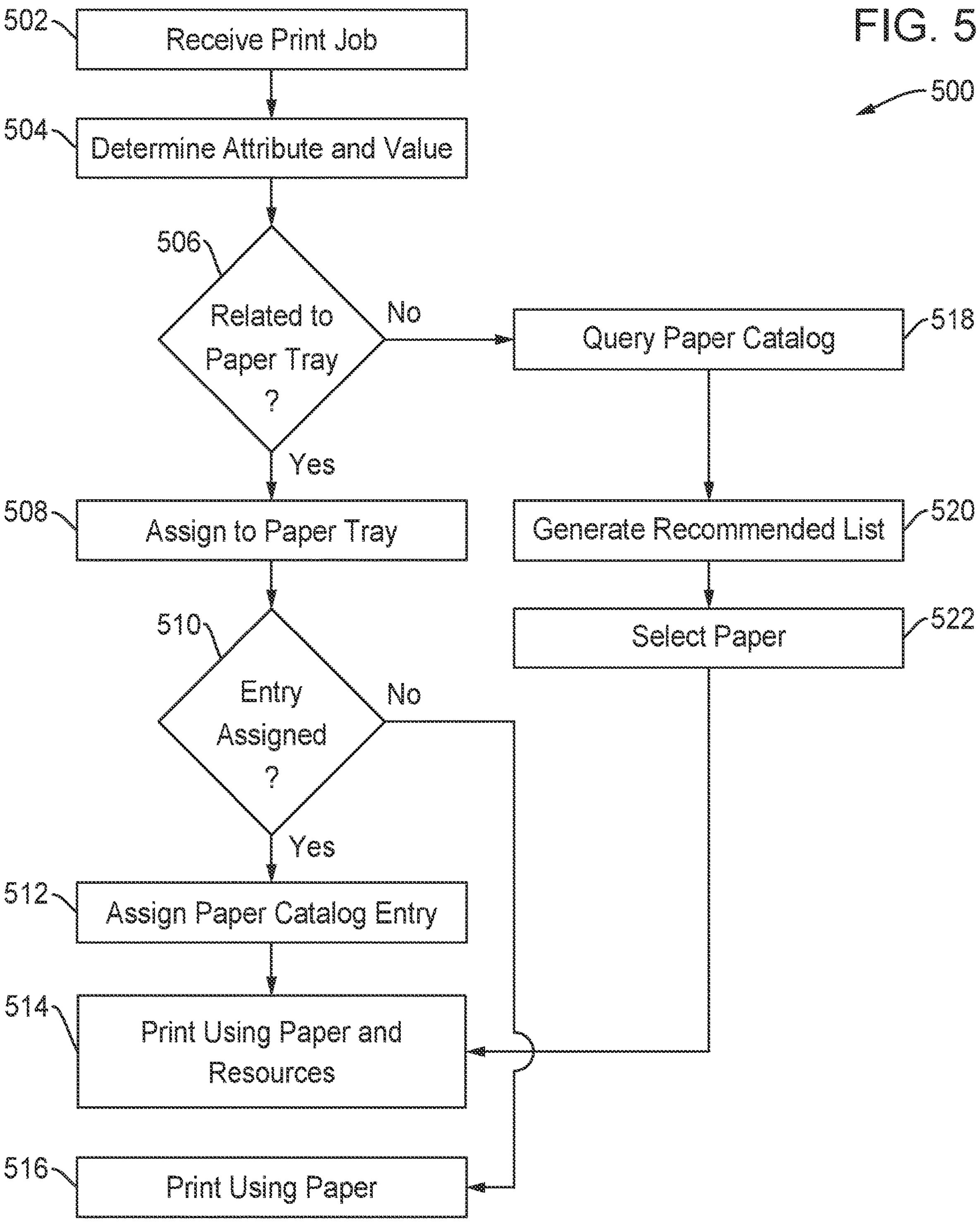
FIG. 5 illustrates a flowchart for managing printing operations using an attribute related to a paper tray at the printing device according to the disclosed embodiments.

FIG. 5 depicts a flowchart 500 for managing printing operations using an attribute related to a paper tray at printing device 104 according to the disclosed embodiments. Flowchart 500 may refer to FIGS. 1A-4 for illustrative purposes. Flowchart 500, however, is not limited to the embodiments disclosed by FIGS. 1A-4.

Step 502 executes by receiving print job 103. Print job 103 may be received at printing device 104 or within printing system 100. Print job 103 most likely will be processed at DFE 106 for printing device 104. Print job 103 may include print ticket 126 along with parameters 128. Step 504 executes by determining at least one attribute with a value for print job 103. For example, the disclosed embodiments may determine first attribute having value 409 and second attribute 410 having value 411 along with dimensions 406 having value 407. For brevity, first attribute 408 and value 409 are disclosed below.

Step 506 executes by determining whether first attribute 409 is related to a paper tray, such as first paper tray 108, configured on printing device 104. As disclosed above, an attribute may relate to a paper tray or paper catalog 124. Print manager 412 may analyze first attribute 508 to determine if it corresponds to a first tray attribute 426 or second tray attribute 428 of first paper tray 108. These tray attributes also may apply to the other paper trays loaded on printing device 104. As disclosed above, certain attributes relate to tray attributes, such as paper color, dimensions, coating, holes, drilled, and the like. Preferably, tray attributes are not attributes normally addressed by entries in paper catalog 124. In some instances, print manager 412 may analyze value 409 of first attribute 408 to determine the status of the attribute.

If step 506 is yes, then step 508 executes by assigning print job to be printed at the paper tray matching first attribute 408. For example, first paper tray 108 may include first tray attribute 426 that corresponds to first attribute 408. The disclosed embodiments will print the document or documents for print job 103 using paper 114 within first paper tray 108.

Step 510 executes by determining whether a paper catalog entry 302 is assigned to first paper tray 108. Paper tray settings may specify a paper catalog entry 302 to print jobs using the paper in the paper tray to reduce printing operations time and steps. If yes, then step 512 executes by assigning paper catalog entry 302 to print job 103. Step 514 executes by printing the document or documents for print job 103 using paper 114 within first paper tray 108 along with the resources set forth in the paper catalog entry 302 assigned to the first paper tray.

If step 510 is no, then step 516 executes by printing the document or documents for print job 103 using paper 114 in first paper tray 108. The disclosed embodiments may not necessarily assign a paper catalog entry 302 for printing operations. In some embodiments, a list of paper catalog entries may be presented to the operator to select and assign to print job 103. The list may be recommended list 432 that is generated based on attributes, as disclosed above.

If step 506 is no, then first attribute 408 is not a paper tray attribute. Thus, flowchart 500 treats the attribute as a paper catalog attribute. Step 518 executes by querying paper catalog 124 with first attribute 408 to find paper catalog entries 302 corresponding to the attribute and value, along with the additional attributes, if appropriate. Step 520 executes by generating recommended list 432 based on the identified paper catalog entries 302 to meet first attribute 408.

Step 522 executes by selecting a paper to use for print job 103 based on the papers listed in recommended list 432. This step may be accomplished in several ways. Print manager 412 may match a paper already loaded in a paper tray at printing device 104 with a paper catalog entry 302 within recommended list 432. If several paper catalog entries apply to the papers, then the disclosed embodiments may determine which paper tray can print the job without the need for a refill. Recommended list 432 may be presented to the operator through user interface 120 to allow the operator to select a paper. Policy 414 may specify which paper to use in printing operations.

Once a paper is selected and determined, such as paper 114 within first paper tray 108, flowchart 500 proceeds to step 514 to print the document or documents for print job 103 using paper 114 and the appropriate paper catalog entry 302. Thus, attributes may be specified for a print job 103. The disclosed embodiments may automatically determine how to treat processing and printing the print job according to the attributes.

Figure 6:
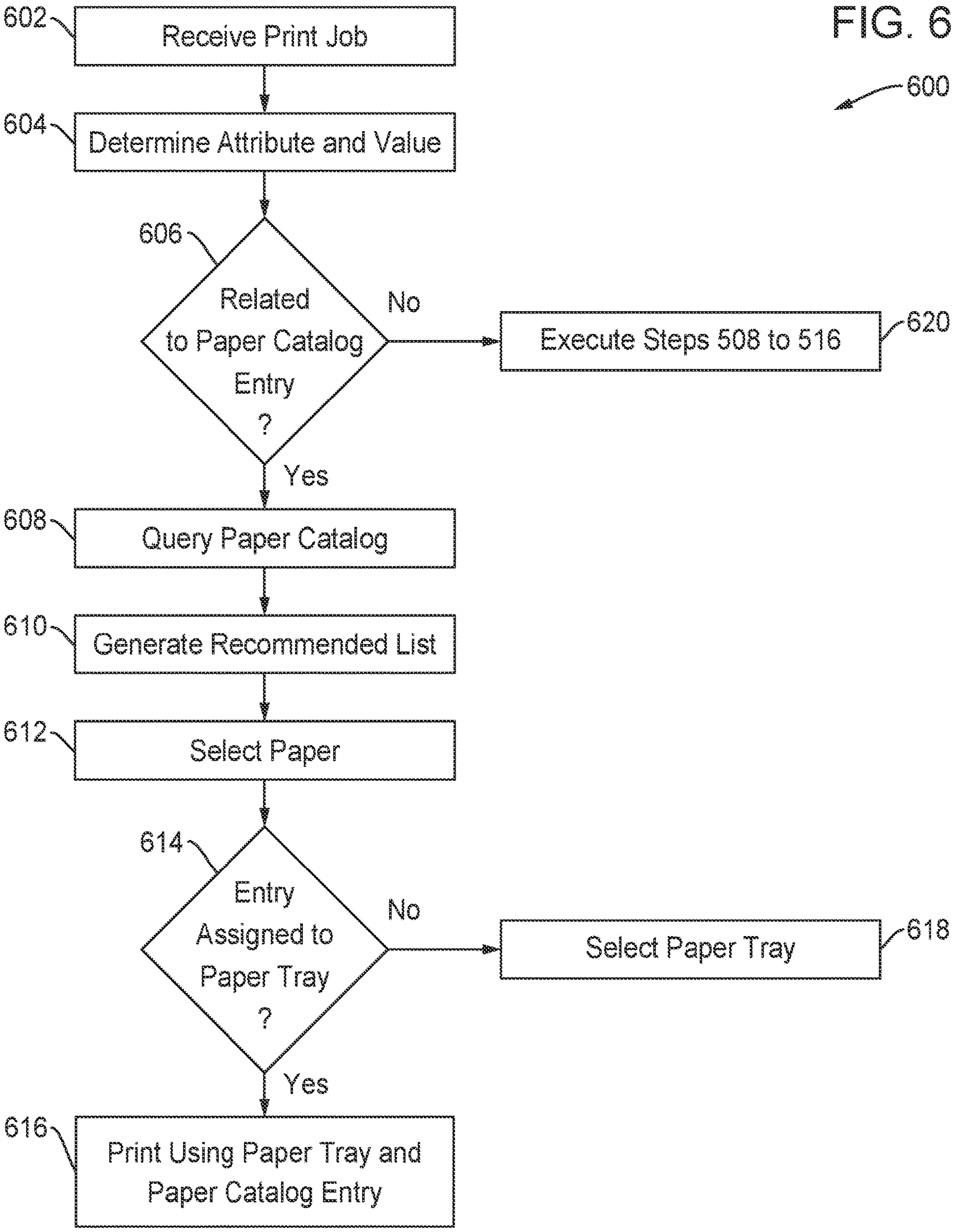
FIG. 6 illustrates a flowchart for managing printing operations using an attribute related to the paper catalog according to the disclosed embodiments.

FIG. 6 depicts a flowchart 600 for managing printing operations using an attribute related to paper catalog 124 according to the disclosed embodiments. Flowchart 600 may refer to FIGS. 1A-5 for illustrative purposes. Flowchart 600, however, is not limited to the embodiments disclosed by FIGS. 1A-5.

Step 602 executes by receiving print job 103. Step 602 corresponds to step 502 disclosed above. Step 604 executes by determining at least one attribute having a value for print job 103. Step 604 corresponds to step 504 disclosed above.

Step 606 executes by determining whether the attribute, such as first attribute 408, is related to paper catalog 124. In particular, print manager 412 determines whether the type of attribute for first attribute 408 is one normally found in paper catalog 124, such as a print condition, thickness, texture, grain, or weight. If yes, then step 608 queries paper catalog 124 using first attribute 408 to identify paper catalog entries 302 that may be applicable for print job 103. This query also may consider additional attributes or values with the attributes for print job 103.

Step 610 executes by generating recommended list 432 of those paper catalog entries 302 that meet the criteria for print job 103, as set forth in the attributes. For example, first attribute 408 for print job 103 may match a first attribute 312 within a paper catalog entry 302. First attribute 312 may be associated with multiple paper catalog entries 302 such that recommended list 432 includes a plurality of papers applicable to process print job 103.

Step 612 executes by selecting a paper to print the document or documents for print job 103. In some embodiments, print manager 412 automatically selects the paper based on various criteria, such as if the paper is loaded onto a paper tray at printing device, preferred instructions set forth in policy 414, or by operator selection. Some embodiments may determining whether the various catalog entries are assigned to a paper tray, such as first paper tray 108.

Thus, step 614 executes by determining whether a paper catalog entry 302 within recommended list 432 is assigned to first paper tray 108, second paper tray 110, up to Nth paper tray 112 configured at printing device 104. The paper corresponding to the paper catalog entry may be loaded into a paper tray at printing device 104. If yes, then step 616 executes by printing the document or documents for print job 103 using the paper at the paper tray and resources for the paper as defined by paper catalog entry 302. For example, paper 114 is loaded onto first paper tray 108. Paper 114 may corresponds to a paper catalog entry 302 in recommended list 432. Print manager 412 assigns paper 114 and the paper catalog entry 302 to process print job 103.

If step 614 is no, then step 618 executes by selecting a paper tray from first paper tray 108, second paper tray 110, up to Nth paper tray 112 to print the document or documents for print job 103. Selection may be made on something else aside from a paper catalog entry. Policy 414 may set forth how to select a paper tray, as disclosed above. Print manager 412 may determine which paper tray has the most sheets of a paper within recommended list 432 to handle print job 103 without reloading. Second attribute 410 may be used if it relates to tray attributes. A tray attribute may be used to identify a paper tray, as disclosed above. Further, the operator may select a paper tray. Flowchart 600 then proceeds to step 616.

Referring back to step 606, if this step is no, then step 620 executes by executing steps 508 to 516 of flowchart 500. For example, first attribute 408 may be a paper tray attribute such that a paper tray is assigned to print job 103 before a paper catalog entry. The disclosed embodiments may execute steps 508 to 516, disclosed above, to complete processing of print job 103.

Figure 7:
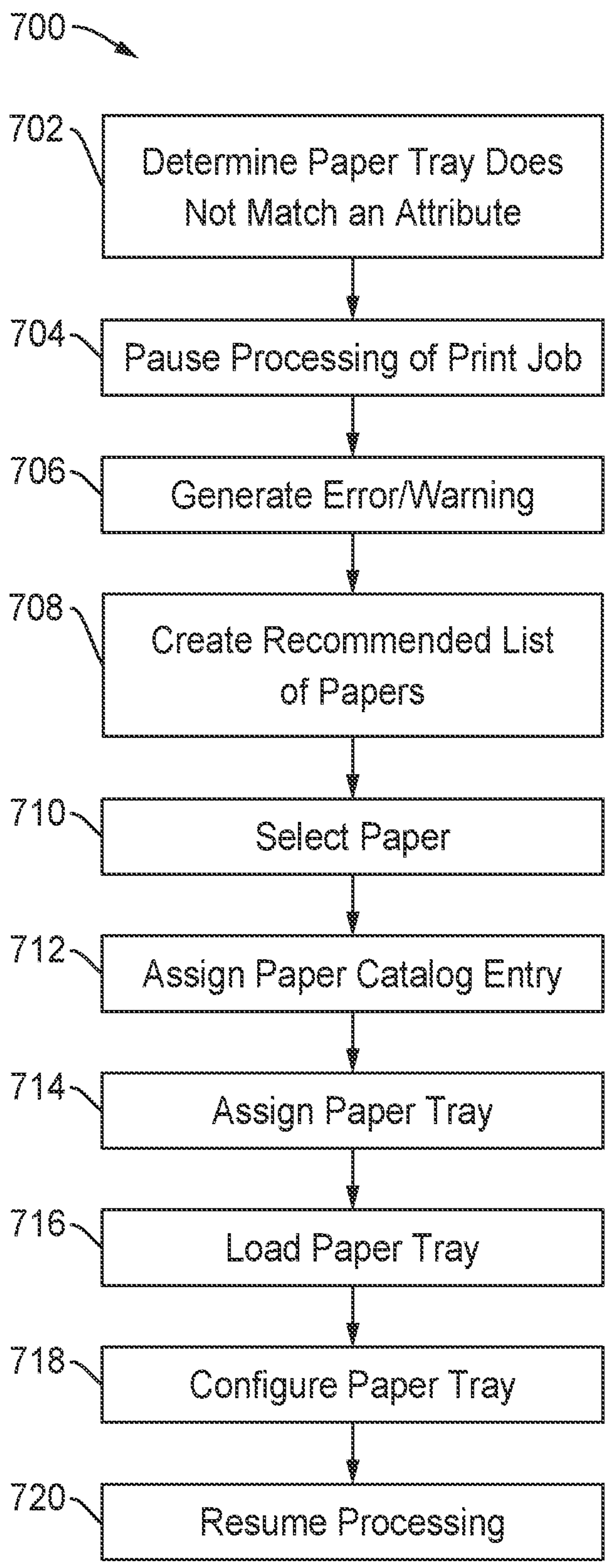
FIG. 7 illustrates a flowchart for managing printing operations using attributes according to the disclosed embodiments.

FIG. 7 depicts a flowchart 700 for managing printing operations using attributes according to the disclosed embodiments. Flowchart 700 may refer to FIGS. 1A-6 for illustrative purposes. Flowchart 700, however, is not limited to the embodiments disclosed in FIGS. 1A-6.

Step 702 executes by determining a paper tray, such as first paper tray 108, second paper tray 110, up to Nth paper tray 112, does not match an attribute, such as first attribute 408, second attribute 410, or dimensions 406, of print job 103. For example, print job 103 may specify a first attribute 408 that is a paper tray attribute, such as paper color. The paper color may not be loaded onto any of the paper trays configured on printing device 104. A query of paper catalog 124 may have been completed as well.

Step 704 executes by pausing processing of print job 103 within DFE 106 and at printing device 104. Print manager 412 may pause printing operations. Step 706 executes by generating an error or warning 440 to alert the operator that a paper tray does not match an attribute specified for print job 103. Warning 440 may be displayed in user interface 120 or some other display at printing device 104. Alternatively, warning 440 may be sent to client device 102 or another device connected to printing system 100, such as a mobile device for the operator.

Step 708 executes by creating a recommended list 432 of papers to use for print job 103. Recommended list 432 may be generated according to different criteria. For example, recommended list 432 may include papers currently loaded at printing device 104 along with their paper catalog entries. These entries may be used to generate groups of papers from paper catalog 124 having the same attributes as the papers loaded onto the paper trays. Other attributes of print job 103, such as second attribute 410, may be applicable to paper catalog 124 and used to generate recommended list 432. The list of paper catalog entries may be further refined to only include papers currently loaded onto the paper trays.

Step 710 executes by selecting a paper from recommended list 432. The selection of a paper from recommended list 432 is disclosed above. Step 712 executes by assigning a paper catalog entry 302 corresponding to the selected paper to print job 103. Step 714 executes by assigning a paper tray to print job 103 based on whether the paper tray corresponds to paper catalog entry 302. For example, paper 114 of first paper tray 108 may correspond to the paper catalog entry. First paper tray 108 is assigned to print the document or documents for print job 103.

In some instances, step 716 may execute to having the operator load first paper tray 108 with enough paper 114 to complete print job 103. In other instances, the operator may swop out the existing paper for the selected paper. Step 718 executes by configuring first paper tray 108 with first tray attribute 426 to match first attribute 408 or another attribute for print job 103. Step 720 executes by resuming printing operations using first paper tray 108 and the paper catalog entry 302 selected for print job 103.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for managing printing operations at a printing device, the method comprising:

receiving a print job for the printing device, wherein the print job specifies an attribute having a value;

determining whether the attribute is related to a paper tray configured on the printing device;

assigning the print job to be printed using the paper tray;

determining a first paper catalog entry and a second paper catalog entry are assigned to the paper tray;

determining whether to assign color printing resources corresponding to the first paper catalog entry or color printing resources corresponding to the second paper catalog entry to the print job;

automatically assigning the color printing resources corresponding to the first paper catalog entry to the print job, wherein the first paper catalog entry meets the value of the attribute;

automatically selecting a paper based on whether the paper is loaded in the paper tray; and printing the print job at the printing device using the paper loaded in the paper tray using the color printing resources corresponding to the first paper catalog entry.

2. The method of claim 1, further comprising providing a list of the first paper catalog entry and the second catalog entry at a user interface.

3. The method of claim 1, further comprising
determining a number of sheets for a first paper media corresponding to the first paper catalog entry and a number of sheets for a second paper media corresponding to the second paper catalog entry.

4. The method of claim 1, wherein determining whether the attribute is related to the paper tray includes determining the value for the attribute is related to the paper tray.

5. The method of claim 1, further comprising determining that the print job also uses the first paper catalog entry based on the attribute.

6. The method of claim 5, wherein a policy indicates that the first paper catalog entry is used based on the attribute.

7. The method of claim 5, further comprising
generating a list of catalog entries applicable for the print job based on the attribute; and
selecting the first paper catalog entry for the list, wherein the first paper catalog entry is supported by the paper tray.

8. The method of claim 1, wherein assigning the print job to be printed using the paper tray includes assigning the paper tray according to a tray priority at the printing device.

9. The method of claim 1, wherein the first catalog entry and the second catalog entry include different color printing resources.

10. A method for managing printing operations at a printing device, the method comprising:
receiving a print job for the printing device, wherein the print job specifies a first attribute;
determining whether the first attribute is related to a first paper catalog entry and a second paper catalog entry applicable for the printing device;
generating a list of paper catalog entries related to the attribute of the print job;
selecting the first paper catalog entry or the second paper catalog entry from the list of paper catalog entries;
determining color printing resources corresponding to the first paper catalog entry instead of color printing resources corresponding to the second paper catalog entry corresponding to the print job is assigned to a paper tray configured at the printing device, wherein the first paper catalog entry meets the first attribute;
assigning the paper tray to the print job; and
printing the print job at the printing device using the paper tray using the color printing resources corresponding to the first paper catalog entry.

11. The method of claim 10, further comprising selecting the paper tray from a plurality of paper trays based on a second attribute of the print job.

12. The method of claim 10, further comprising
determining a number of sheets for a first paper media corresponding to the first paper catalog entry and a number of sheets for a second paper media corresponding to the second paper catalog entry, wherein the first paper media and the second paper media are loaded at the printing device;
assigning the first paper catalog entry to the print job if the number of sheets for the first paper media is greater than the number of sheets for the second paper media; and
assigning the second paper catalog entry to the print job if the number of sheets for the second paper media is greater than the number of sheets for the first paper media.

13. The method of claim 10, wherein determining whether the first attribute is related to the first paper catalog entry includes determining whether a value of the first attribute is related to the paper catalog entry.

14. The method of claim 10, wherein a policy indicates that the first paper catalog entry is used based on the attribute.

15. The method of claim 10, wherein assigning the print job to the paper tray includes assigning the paper tray according to a tray priority at the printing device.

16. The method of claim 10, wherein the first catalog entry and the second catalog entry include different color printing resources.

* * * * *